US011201888B2

(12) United States Patent
Grubb et al.

(10) Patent No.: US 11,201,888 B2
(45) Date of Patent: Dec. 14, 2021

(54) METHODS AND SYSTEMS FOR DISCOVERING NETWORK SECURITY GAPS

(71) Applicant: MasterCard International Incorporated, Purchase, NY (US)

(72) Inventors: Jonathan Grubb, Ballwin, MO (US); Brian D. Wickenhauser, St. Peters, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 91 days.

(21) Appl. No.: 15/400,685

(22) Filed: Jan. 6, 2017

(65) Prior Publication Data

US 2018/0198813 A1    Jul. 12, 2018

(51) Int. Cl.
*H04L 29/06*     (2006.01)
*H04L 9/32*      (2006.01)

(52) U.S. Cl.
CPC ........ *H04L 63/1433* (2013.01); *H04L 9/3239* (2013.01); *H04L 63/20* (2013.01)

(58) Field of Classification Search
CPC ............... H04L 63/1433; H04L 9/3239; H04L 63/1466; H04L 63/166
USPC ......................................................... 726/25
See application file for complete search history.

(56) References Cited

U.S. PATENT DOCUMENTS

| | | | |
|---|---|---|---|
| 6,185,689 B1 * | 2/2001 | Todd, Sr. ............... | G06F 21/577 705/53 |
| 7,325,252 B2 | 1/2008 | Bunker et al. | |
| 7,748,040 B2 * | 6/2010 | Adelstein ............ | H04L 63/1491 726/25 |
| 7,784,099 B2 | 8/2010 | Benjamin | |
| 8,069,471 B2 | 11/2011 | Boren | |
| 8,286,249 B2 | 10/2012 | Adelstein et al. | |
| 8,335,678 B2 | 12/2012 | Hughes et al. | |
| 8,522,344 B2 | 8/2013 | Ormazabal et al. | |
| 8,671,224 B2 | 3/2014 | Bell et al. | |
| 8,782,796 B2 | 7/2014 | Hawthorn et al. | |
| 8,887,284 B2 | 11/2014 | Kovar et al. | |
| 8,978,102 B2 | 3/2015 | Hughes et al. | |
| 9,015,847 B1 | 4/2015 | Kaplan et al. | |
| 2003/0028803 A1 | 2/2003 | Bunker et al. | |
| 2003/0056116 A1 * | 3/2003 | Bunker, V ............. | H04L 43/00 726/25 |
| 2004/0025050 A1 * | 2/2004 | Godwin ................ | G06F 21/577 726/4 |
| 2006/0031938 A1 | 2/2006 | Choi | |
| 2006/0248590 A1 | 11/2006 | Johnson | |

(Continued)

*Primary Examiner* — Fatoumata Traore
*Assistant Examiner* — Moeen Khan
(74) *Attorney, Agent, or Firm* — Armstrong Teasdale LLP

(57) ABSTRACT

A risk assessment (RA) computing device for generating network security campaigns to discover network security gaps. The RA computing device includes at least one processor in communication with a memory and a network. The RA computing device is programmed to generate a tracer file and transmit the tracer file to the network for enabling a verified user to attempt to retrieve the tracer file from the network. The verified user retrieves the tracer file from the network and uploads the tracer file to the RA computing device. The RA computing device performs one or more validations against the tracer file to verify that the tracer file was generated by the verified user.

19 Claims, 11 Drawing Sheets

(56) References Cited

U.S. PATENT DOCUMENTS

| | | | |
|---|---|---|---|
| 2007/0143851 A1* | 6/2007 | Nicodemus | G06F 11/3495 |
| | | | 726/25 |
| 2009/0262741 A1* | 10/2009 | Jungck | H04L 29/12066 |
| | | | 370/392 |
| 2012/0224057 A1 | 9/2012 | Gill et al. | |
| 2013/0250330 A1* | 9/2013 | Chigusa | H04N 1/4413 |
| | | | 358/1.13 |
| 2014/0373167 A1* | 12/2014 | Matsumura | H04L 67/22 |
| | | | 726/26 |
| 2015/0163121 A1* | 6/2015 | Mahaffey | H04L 63/1425 |
| | | | 707/687 |
| 2015/0234848 A1* | 8/2015 | Weinstein | H04L 9/3239 |
| | | | 707/698 |
| 2015/0281287 A1 | 10/2015 | Gill et al. | |
| 2015/0372879 A1* | 12/2015 | Mori | H04L 63/107 |
| | | | 709/203 |
| 2016/0099963 A1* | 4/2016 | Mahaffey | H04L 63/0227 |
| | | | 726/25 |
| 2016/0352771 A1* | 12/2016 | Sivan | G06F 21/577 |

* cited by examiner

Upload Tracer File

Home / Download

Upload a Tracer file

Use the form below to upload the tracer file you have successfully gotten off of the corporate network. Your file will be validated against our checks to ensure you followed the rules.

[ Upload Your Tracer Files ]

Completed Campaigns

The trace files below have been completed. After successfully completing a campaign, click the submit button next to the verified file below to enter into our contest.

| Filename | Date Generated | Upload Date | File Size | File Verification | Download Link |
|---|---|---|---|---|---|
| Tracer_0121.pdf | 1/29/2016 | 1/29/2016 | 35.25mb | X | Download |
| Tracer_3321.pdf | 1/22/2016 | 1/22/2016 | 1.08gb | ✓ | Download |

Pages  About  Download Tracer File  Upload Tracer File  Contact  [SIGN IN]

FIG. 6

Summary of your exfiltration method

Please provide a one or two sentence summary of the method you used to move your Tracer file off of the network. — 702

What third part services did you use. (if other please specify)
- ☐ Box.com
- ☐ Gmail
- ☐ Google Docs
- ☐ Dropbox
- ☐ Other (Please Specify)

Other — 704

Detailed summary: Please enter a detailed summary outlining how you exfiltrated your Tracer file. Remember to be as detailed as possible to achieve maximum points — 706

Submit to Contest — 708

FIG. 7B

Active Campaigns

The following campaign have been initiated by users

| Username | Name | Filename | Hash | Uploaded | Submitted | Action |
|---|---|---|---|---|---|---|
| abercrombieboi | Wickenhauser, Brian | Tracer_0121.pdf 35.25mb Download | 8b4096c7f6568a7ea2fa43d15c928fb0 | X | X | Generate Short Rule |
| jonnyg | Grubb, Jon | Tracer_3321.pdf 35.22mb Download | 8b4096c7f6568a7ea2fa43d15c928fb0 | ✓ | ✓ | Generate Short Rule View Submission |

FIG. 8B

METHODS AND SYSTEMS FOR DISCOVERING NETWORK SECURITY GAPS

BACKGROUND

The field of the disclosure relates to network security, and, more specifically, to network-based methods and systems for generating network security campaigns to discover network security vulnerabilities and gaps.

In computer networks, computing devices exchange data with each other using data links. Most computing devices are connected to networks like the Internet, intranets, and telecommunication networks. In other words, networks have become an unavoidable tool in life and business. However, networks are also exposed to various attacks, such as stealing data through network hacking. Therefore, it is important to provide a secure network environment.

Recently, there has been a large growth in the demand for secure networks. The need to protect customer data has led companies to invest more and more in protecting their networks. Networks are vulnerable to attacks by malicious intruders, and as their importance to organizations increases, so does the need for security. Awareness of the need for secure networks has also increased dramatically as a result of publicity in the news media regarding damage caused by hackers breaking into networks using vulnerabilities or gaps in network security, thus creating an even higher demand for security.

Unfortunately, network security gaps that enable unauthorized users to remove sensitive data from an organization's network are often not discovered until after the fact. Furthermore, finding these security gaps is difficult and time consuming. In many cases, the people responsible for locating these security gaps within an organization's network have to rely on theory over practical experience. While at least some known organizations rely on third parties to locate network security gaps within the organization's corporate networks, this typically gives little insight into methods, tools, and other issues that exist currently in an organization's network. Oftentimes, employees of an organization are the most qualified for seeking and discovering network security gaps.

BRIEF DESCRIPTION OF THE DISCLOSURE

In one aspect, a risk assessment (RA) computing device for generating network security campaigns to discover network security gaps is provided. The RA computing device includes at least one processor in communication with a memory and a network. The RA computing device is further in communication with a first computing device and a second computing device. The at least one processor is programmed to receive a range of IP addresses and store the range of IP addresses into the memory. The at least one processor is also programmed to receive, from the first computing device, a request to generate a tracer file. The request includes an IP address of the first computing device. The at least one processor is further programmed to verify that the IP address of the first computing device is within the range of IP addresses stored into the memory. The at least one processor is also programmed to generate the tracer file in response to the received request to generate the tracer file and the verification of the IP address of the first computing device. The at least one processor is further programmed to provide the tracer file to the network to enable a verified user to attempt to retrieve the tracer file from the network. The at least one processor is also programmed to receive, from the second computing device, a request to upload the tracer file after the verified user retrieves the tracer file from the network. The request includes an IP address of the second computing device. The at least one processor is further programmed to verify that the IP address of the second computing device is outside the range of IP addresses stored into the memory. The at least one processor is also programmed to upload, from the second computing device, the tracer file to the memory. The at least one processor is further programmed to perform one or more validations against the tracer file to verify that the tracer file was generated by the verified user.

In another aspect, a computer-implemented method for generating network security campaigns to discover network security gaps is provided. The method is implemented by a RA computing device in communication with a memory, a network, a first computing device, and a second computing device. The method includes receiving, by the RA computing device, a range of IP addresses. The method also includes storing, by the RA computing device, the range of IP addresses into a memory. The method further includes receiving, by the RA computing device, a request to generate a tracer file by the first computing device. The generate request includes an IP address of the first computing device. The method also includes verifying, by the RA computing device, that the IP address of the first computing device is within the range of IP addresses stored into the memory. The method further includes generating, by the RA computing device, the tracer file in response to the received request to generate the tracer file and the verification of the IP address of the first computing device. The method also includes providing, by the RA computing device, the tracer file to the network to enable a verified user to attempt to retrieve the tracer file from the network. The method further includes receiving, by the RA computing device, a request to upload the tracer file from the second computing device after the verified user retrieves the tracer file from the network. The request includes an IP address of the second computing device. The method also includes verifying, by the RA computing device, that the IP address of the second computing device is outside the range of IP addresses stored into the memory. The method further includes uploading, by the RA computing device, the tracer file to the memory. The method also includes performing, by the RA computing device, one or more validations against the tracer file to verify that the tracer file was generated by the verified user.

In still another aspect, a computer-readable storage media for generating network security campaigns to discover network security gaps having computer-executable instructions embodied thereon is provided. When executed by at least one processor, the computer-executable instructions cause the processor to receive a range of IP addresses. The computer-executable instructions also cause the processor to store the range of IP addresses into a memory. The computer-executable instructions further cause the processor to receive a request to generate a tracer file by a first computing device. The generate request includes an IP address of the first computing device. The computer-executable instructions also cause the processor to verify that the IP address of the first computing device is within the range of IP addresses stored into the memory. The computer-executable instructions further cause the processor to generate the tracer file in response to the received request to generate the tracer file and the verification of the IP address of the first computing device. The computer-executable instructions also cause the processor to provide the tracer file to a network to enable a verified user to attempt to retrieve the tracer file from the network. The computer-executable instructions further cause the processor to receive a request to upload the tracer file from a second computing device after the verified user retrieves the tracer file from the network. The request includes an IP address of the second computing device. The computer-executable instructions also cause the processor to verify that the IP address of the second computing device is outside the range of IP addresses stored into the memory. The computer-executable instructions further cause the processor to upload the tracer file to the memory. The computer-executable instructions further cause the processor to perform one or more validations against the tracer file to verify that the tracer file was generated by the verified user.

BRIEF DESCRIPTION OF THE DRAWINGS

FIGS. 1-9 show example embodiments of the methods and systems described herein.

FIG. 1 is a block diagram of an example embodiment of a computer system used in generating network security campaigns that includes a risk assessment (RA) computing device in accordance with one example embodiment of the present disclosure.

FIG. 2 illustrates an example configuration of a server system such as the RA computing device of FIG. 1.

FIG. 3 illustrates an example configuration of a client system shown in FIG. 1.

FIG. 4 is a diagram of components of one or more example computing devices that may be used in the system shown in FIG. 1.

FIGS. 5-8B are example screenshots of campaign data displayed on a user interface of a user computing device.

FIG. 9 is a simplified diagram of an example method for enabling authorized users to participate in network security campaigns using the RA computing device of FIG. 1.

Figure 1:
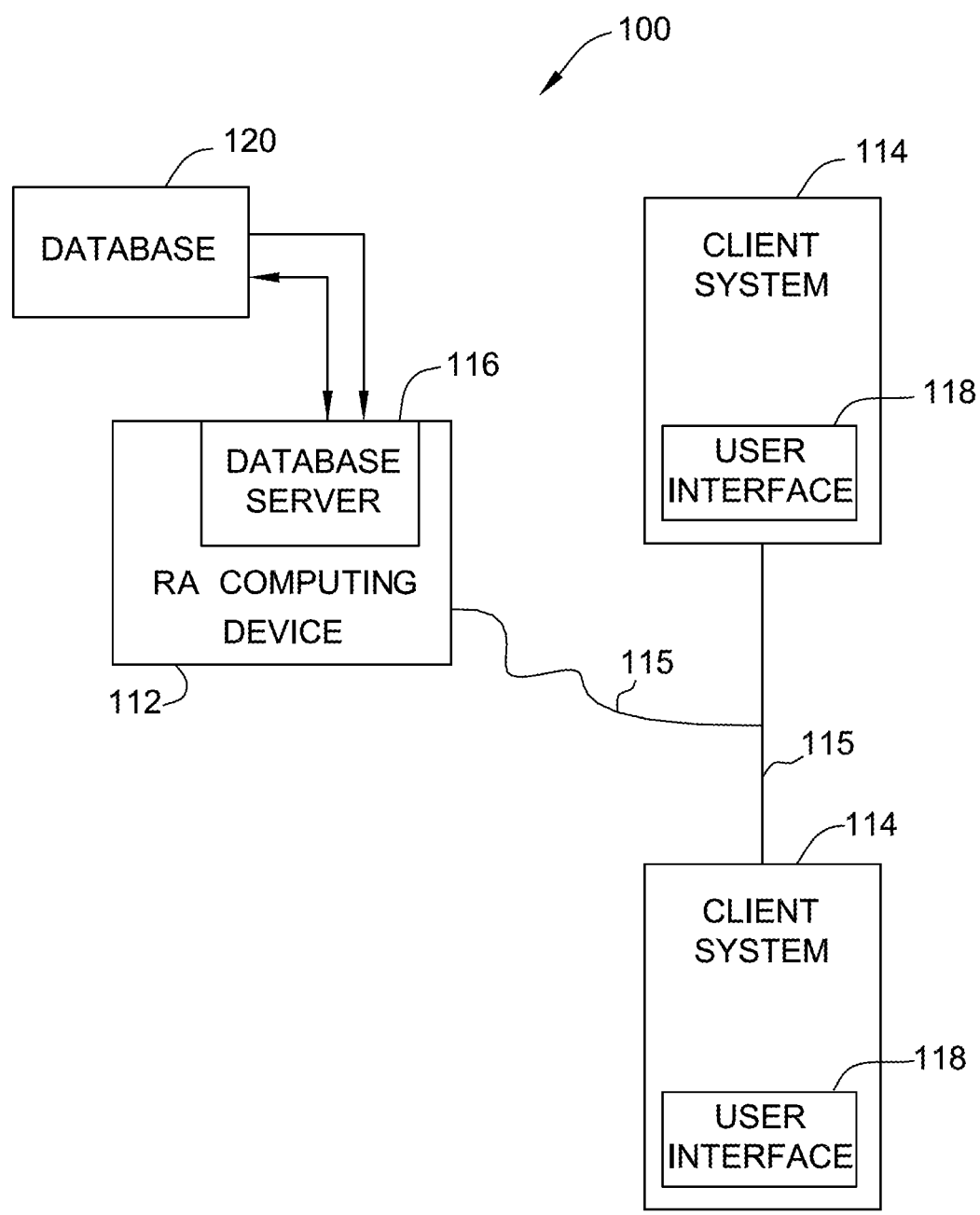

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

The systems and methods described herein enable authorized users to participate in game-based campaigns to discover network security gaps in an organization's computer network. The systems and methods described herein are implemented by a special purpose computing device that may be referred to as a "risk assessment computing device." The risk assessment (RA) computing device includes a processor in communication with a memory. The RA computing device is in communication with a computer network (hereafter, a "network") and a custom web portal. The RA computing device is configured to enable an authorized user (hereafter, a "user" or "users") to generate, via the custom web portal, a custom file referred to as a "tracer file." The RA computing device stores the tracer file within the network. The user attempts to remove the tracer file from the network and onto a remote computing device that resides outside of the network, thereby exposing potential network security gaps. A campaign provides real world data on how unauthorized users could potentially remove confidential data from an organization's network.

As defined herein, a "campaign" is a challenge for users of a network to discover potential network security gaps. In the example embodiment, the network is associated with an organization and the users may be employees or outside contractors of the organization. An administrator with authorized access to the network creates a campaign using a graphical user interface (UI) web portal displayed on a computing device in communication with the RA computing device. For example, the RA computing device may host or be in communication with a computing device that hosts a website serving as the web portal. The web portal is configured to enable the administrator to, among other things, create a campaign and monitor campaigns. The web portal is further configured to enable a user to, among other things, view campaigns, generate tracer files from the RA computing device, and upload tracer files to the RA computing device. As defined herein, a "tracer file" is a dynamically generated file, such as a portable document format (PDF) file, containing "fake" or "test" sensitive content such as personally identifiable information (PII), confidential and proprietary tags, and custom keywords configured by the administrator.

The administrator may select campaign customization options prior to generating the campaign. In the example embodiment, customization options enable the administrator to include in the tracer file at least one or more of fake payment card (credit, debit, reward, etc.) numbers, fake social security numbers, fake usernames and passwords, custom keywords, and sensitivity tags and labels such as "proprietary" and "confidential." Each campaign may include different customization options. The administrator then generates the campaign, which can be accessed by users in the web portal. Tracer files generated in association with the campaign include the customization options selected by the administrator.

A campaign enables users to create a tracer file associated with the campaign. When a campaign is active, users participate in the campaign by logging into the web portal and generating a tracer file from a "tracer file generation" webpage. Each user is enrolled with the RA computing device such that the user can access one or more campaigns using the web portal. This includes providing the RA computing device with login information (e.g., a username and a password). A user enters candidate login information into the web portal, which is transmitted (e.g., in the form of a candidate login input) directly or indirectly to the RA computing device (e.g., through the website and the host). The RA computing device stores login information in a login information database such that the RA computing device receives a candidate login input corresponding to a user and grants the user access to the web portal. The RA computing device compares that candidate login information (e.g., candidate login input) to a list of login information to retrieve data (i.e., campaigns) corresponding to the user logging into the web portal. For example, the RA computing device may host a website and/or otherwise provide instructions to the user device which causes the display of data. For example, in some embodiments, the RA computing device causes the user computing device and/or remote computing device to display a campaign generation webpage, tracer file generation webpage, tracer upload webpage, and/or other webpages and displays.

When a user creates a tracer file associated with a campaign, the RA computing device generates the tracer file and downloads the tracer file to a user computing device connected to the network. In the example embodiment, the tracer file is downloaded to the user computing device used by the user to generate the tracer file. The user then attempts to remove the tracer file from the network and onto a remote computing device that resides outside of the network. If the user successfully removes the tracer file from the network, the user utilizes the web portal to upload the tracer file back to the RA computing device. The web portal then prompts the user to provide a written description of a method the user utilized to remove the tracer file from the network. In some embodiments, the user is entered into a contest for a chance to win prizes.

Access to the tracer file generation webpage is restricted to users using computing devices connected to the network. Before an administrator launches a campaign, the administrator uses an "administrator" webpage to specify at least one external Internet protocol (IP) address range of the network, which is received by the RA computing device and stored into memory. In order for a user to access the tracer file generation webpage, a request for the tracer file generation webpage must come from a computing device with an IP address within the IP address range specified by the administrator. Requests from computing devices with IP addresses outside the IP address range identified by the administrator are blocked by the RA computing device, and the user will not be able to access the tracer file generation webpage and generate a tracer file.

When a user accesses the tracer file generation webpage from a computing device (i.e., a first computing device) connected to the network and with an IP address within the IP address range specified by the administrator, the user is given an option to generate a new tracer file. When the user chooses to generate a new tracer file, the RA computing device generates a tracer file unique and traceable to the user. The RA computing device includes, but is not limited to, one or more of the following attributes in the tracer file: (i) a unique name given to the tracer file upon generation, (ii) a unique identification given to the tracer file upon generation, (iii) a time and a date that the tracer file was generated, (iv) a name of the user that generated the tracer file, (v) custom warnings and language specified by the administrator to include in the tracer file, such as warnings, contact information, etc., (vi) fake payment card (credit, debit, rewards, etc.) numbers, (vii) fake PII data, such as addresses, social security numbers, etc., (viii) fake usernames and passwords, (ix) custom keywords configured by the administrator, (x) sensitivity tags and labels such as "proprietary" and "confidential," and (xi) a MD5 hash value for the tracer file.

When a user generates a tracer file, the tracer file becomes an active file in the user's campaign. As defined herein, an "active file" is a tracer file in the network that the user has not yet removed from the network to a remote computing device and then uploaded to the web portal. In the example embodiment, the user is able to view, via the tracer file generation webpage, tracer files that the user has generated. The user can also re-download active tracer files at any time so long as the user is attempting to do so using a computing device connected to the network with an IP address within the IP address range specified by the administrator.

The RA computing device stores each tracer file and attributes about each tracer file in a database. The RA computing device collects and stores into the database at least, but not limited to, one or more of the following attributes: (i) a name of a user who generated the tracer file, (ii) an IP address of the user who generated the tracer file, (iii) a session cookie value of the user when the tracer file was generated, (iv) a date and a time the tracer file was generated, (v) a user agent string of the request when the file was generated, (vi) a unique file name of the tracer file, (vii) a unique file identification of the tracer file, (viii) an exact size of the tracer file, and (ix) a calculated MD5 hash value of the file. An administrator can access and view data stored in the tracer file database using the web portal.

Once the user has downloaded the tracer file to the network, the user attempts to remove the tracer file from the network onto a remote computing device (i.e., a second computing device) outside the network using whatever tools, methods, websites, or other means chosen by the user. If the user successfully transfers the tracer file from the network onto a remote computing device, the user then uploads the tracer file from the remote computing device to the web portal (for example, using an "uploads" webpage in the web portal). Once the tracer file is uploaded to the web portal (hereafter, referred to as the "uploaded tracer file"), the uploaded tracer file is transmitted to the RA computing device. The RA computing device performs one or more validations against the uploaded tracer file to ensure that the uploaded tracer file is the same tracer file that the user generated using the tracer file generation webpage. The one or more validations include, but are not limited to, one or more of the following: (i) calculating the MD5 hash value of the uploaded tracer file and checking the MD5 hash value against the user's generated tracer file hash value to ensure the uploaded tracer file was generated by the user, (ii) comparing the user's current user agent string against the user agent string used to generate the tracer file to ensure that the user is not using the same computer used to generate the tracer file, and (iii) comparing the session cookie value used to generate the tracer file against the user's current session cookie value to ensure that the user is not using the same computer used to generate the tracer file. If the uploaded tracer file is validated, the RA computing device stores the tracer file in the memory and associates the tracer file with campaigns completed by the user.

As part of uploading the tracer file to the uploads webpage, the user completes an online form. The user completes the online form by providing a written description or report of how the user removed the tracer file from the network. An administrator is able to use the web portal to view reports submitted by users. In the example embodiment, the RA computing device displays a report accompanied by data about the uploaded tracer file. This information is used by the organization to fix network vulnerabilities and/or network gaps identified in the network that resulted in the exfiltration of the tracer file. The information is also used to design a remediation plan to fix network vulnerabilities and/or network gaps at the conclusion of the campaign.

In addition to the features outlined above, administrators will also be able to use information collected about campaigns to track generated tracer files. An administrator can use a "reporting" webpage of the web portal to view information that can be implemented by corporate security for detecting tracer files leaving the network. Some features that the administrator can leverage to detect tracer files leaving the network include (i) exporting MD5 hash values of all active tracer files, (ii) generating Snort intrusion detection system (IDS) signatures for active tracer files, (iii) exporting all filenames of active tracer files, (iv) generating regular expression statements that can be used to detect active tracer files, and (v) an ability to download a copy of any generated or submitted tracer file for further review, or implementing other detection mechanisms in the network.

In the example embodiment, the RA computing device implements IP address restrictions for the uploads webpage. More specifically, the RA computing device will only allow access to the uploads webpage to authorized users attempting to connect from an IP address that is not in the IP address range specified by the administrator. This embodiment is implemented to reduce the likelihood that a user simply re-uploads the tracer file from the same computing device used to generate the tracer file. The first computing device connected to the network to generate the tracer file may be the same computing device as the second computing device used to remove the tracer file from the network if, for example, the first computing device is within the IP address range when generating the tracer file and outside the IP address range when uploading the tracer file. In other words, the first computing device and the second computing device could be the same device, but have a different IP address because they are connected to the network through a different address.

In another embodiment, once a user has successfully completed a campaign, the user can submit the campaign to be judged as part of a contest for a chance to win prizes. In order to submit to the contest, the user provides a report as described above that includes a detailed description of how the user removed the tracer file from the network and submits the report to the contest using a "submissions" webpage. The submission web page includes details about how a campaign will be scored, including: (i) originality (i.e., how original the user's exfiltration method was compared to their peers, with more original methods receiving higher scores), (ii) repeatability (i.e., can security reproduce the user's method of exfiltration, with higher reproducibility resulting in a higher score), (iii) versatility (i.e., can the method used to exfiltrate the tracer file be used to exfiltrate other file types and sizes, with higher versatility resulting in a higher score), (iv) detectability (i.e., how effective was security at detecting the tracer file as it left the network, with lower detectability resulting in a higher score), and (v) explanation (i.e., the user is encouraged to be as detailed as possible in order to receive a higher score). Administrators and/or corporate security review and assign a score value to each submission. The score values are used to judge the contest and determine which user or users win the contest.

In another embodiment, the RA computing device is configured to analyze the detailed description of how the user removed the tracer file from the network to determine a level of security risk associated with a security gap. More specifically, the RA computing device analyzes the descriptive text by parsing, tagging and/or filtering the descriptive text to rate the level of security risk associated with a security gap. In one embodiment, the rating is performed on a predefined scale (i.e., 1-10, color coded, etc.), wherein the rating is viewable by an administrator. In another embodiment, the RA computing system warns the administrator, through the web portal or another means such as electronic mail, that a high security risk has been identified.

The systems and methods described herein are configured to facilitate the following technical benefits: (i) enabling an organization to perform a rapid, crowd-sourced risk assessment of the organization's computer network, and enabling the organization to quickly fix security issues that could lead to data exfiltration, (ii) highlighting a wide variety of security gaps that exists in real time within a network that allow users to move data out of the network, (iii) providing real world data on how users could potentially move confidential data out of the network, (iv) controlling access to data based on IP addresses; and (v) increasing security of important and sensitive data.

The technical effects of the systems and methods described herein can be achieved by performing at least one of the following steps: (i) creating a campaign, including selecting campaign customization options and specifying an external Internet protocol (IP) address range of the network prior to generating the campaign; (ii) requesting, in a web portal, to generate a tracer file, where the request for the tracer file must come from a computing device with an IP address within the IP address range specified by the administrator; (iii) generating the tracer file and downloading the tracer file to a user computing device connected to a network; (iv) removing the tracer file from the network and onto a remote computing device that resides outside of the network; (v) utilizing the web portal to upload the tracer file from the remote computing device to the RA computing device; (vi) providing a written description of a method the user utilized to remove the tracer file from the network; (vii) entering the user into a contest for a chance to win prizes; and (viii) performing one or more validations against the uploaded tracer file to ensure that the uploaded tracer file is the same tracer file that was originally generated by the RA computing device.

The following detailed description of the embodiments of the disclosure refers to the accompanying drawings. The same reference numbers in different drawings may identify the same or similar elements. Also, the following detailed description does not limit the claims.

Described herein are computer devices such as a risk assessment (RA) computing device, remote computing devices, and user computing devices. As described herein, all such computer devices include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to the generation and communication (e.g., display) of sole and/or aggregate merchant and/or sector valuation analytics, scores, and/or other analytics.

FIG. 1 is a block diagram of an example embodiment of a computer system 100 that enables authorized users to participate in network security campaigns in accordance with one example embodiment of the present disclosure. In the example embodiment, system 100 includes an RA (risk assessment) computing device 112 used for, among other things, creating network security campaigns, generating, downloading, and uploading tracer files, and displaying the campaigns and other data on a user interface, as described herein. In the example embodiment, system 100 further includes a plurality of client sub-systems, also referred to as client systems 114, connected to RA computing device 112. In one embodiment, client systems 114 are computers including a web browser, such that RA computing device 112 is accessible to client systems 114 using the Internet and/or using network 115. Client systems 114 are interconnected to the Internet through many interfaces including network 115, such as a local area network (LAN) or a wide area network (WAN), dial-in-connections, cable modems, special high-speed Integrated Services Digital Network (ISDN) lines, and RDT networks. In the example embodiment, client systems 114 are associated with employees and/or administrators of an organization. RA computing device 112 is also in communication with a network 115.

Client systems 114 could be any device capable of interconnecting to the Internet including a desktop computer, a laptop computer, a web-based phone, a PDA, or other web-based connectable equipment.

A database server 116 is connected to database 120, which contains information on a variety of matters, as described below in greater detail. In one embodiment, database 120 is stored on RA computing device 112 and can be accessed by users at one of client systems 114 by logging onto RA computing device 112 through one of client systems 114. In an alternative embodiment, database 120 is stored remotely from RA computing device 112 and may be non-centralized. Database 120 may be a database configured to store information used by RA computing device 112 including, for example, (i) a database of login information; (ii) campaign data; (iii) tracer files; (iv) tracer file attribute data; (v) reports and descriptions describing the tracer file extractions submitted by users; (vi) fake sensitive content, such as personally identifiable information (PII), confidential and proprietary tags, and custom keywords configured by the administrator; (vii) internet protocol (IP) addresses; (viii) validation data, including MD5 hash value and user agent strings and session cookie value; (ix) scoring rules, and/or other data. Database 120 may include a single database having separated sections or partitions, or may include multiple databases, each being separate from each other.

In the example embodiment, each client system 114 includes a user interface 118. For example, user interface 118 may include a graphical user interface with interactive functionality, such that campaign data, transmitted from RA computing device 112 to client system 114, may be shown in a graphical format. A user of client system 114 may interact with user interface 118 to view, explore, and otherwise interact with the web portal. In the example embodiment, the web portal is hosted by or stored on RA computing device 112 and accessed by client system 114. For example, the web portal may be stored on and executed by RA computing device 112. Client system 114 may provide inputs to the web portal. The inputs are received by RA computing device 112 via network 115 which are used by RA computing device 112 to execute functions as described above (for example, create a tracer file). The web portal may further provide output to client system 114. Web portal may be a website (e.g., hosted by RA computing device 112), application, or other tool.

In further alternative embodiments, the user may access the web portal hosted by RA computing device 112 to, among other things, request to generate and download a tracer file to a user computing device connected to a network, upload the tracer file from a remote computing device to RA computing device 112, and provide a written description of a method the user utilized to remove the tracer file from the network. The administrator may access the web portal hosted by RA computing device 112 to, among other things, create a campaign, view campaigns and tracer files, and view written descriptions provided by users.

Figure 2:
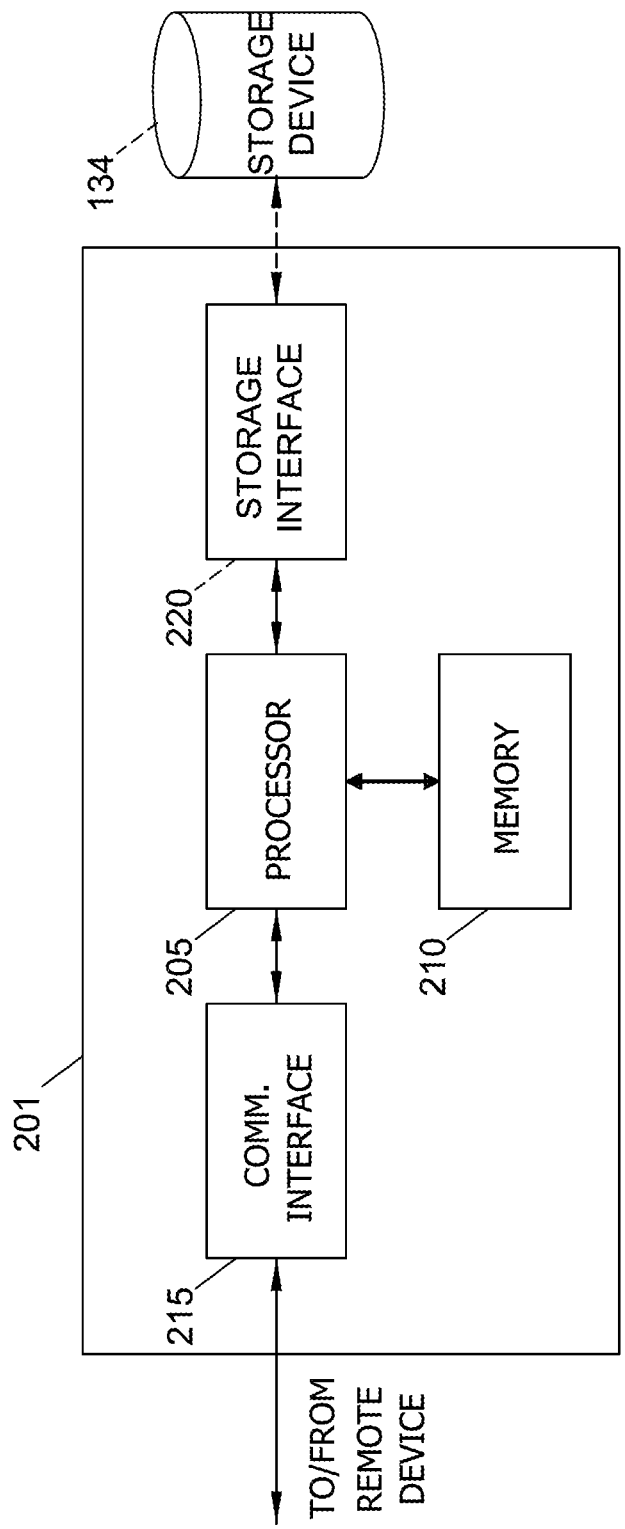

FIG. 2 illustrates an example configuration of a server system 201 such as RA computing device 112 (shown in FIG. 1) used to create network security campaigns, in accordance with one example embodiment of the present disclosure. Server system 201 may also include, but is not limited to, database server 116. Server system 201 includes a processor 205 for executing instructions. Instructions may be stored in a memory area 210, for example. Processor 205 may include one or more processing units (e.g., in a multi-core configuration) for executing instructions. The instructions may be executed within a variety of different operating systems on the server system 201, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 205 is operatively coupled to a communication interface 215 such that server system 201 is capable of communicating with a remote device such as client system 114 or another server system 201. For example, communication interface 215 may receive requests from client system 114 via the Internet, as illustrated in FIG. 1.

Processor 205 may also be operatively coupled to a storage device 134. Storage device 134 is any computer-operated hardware suitable for storing and/or retrieving data. In some embodiments, storage device 134 is integrated in server system 201. For example, server system 201 may include one or more hard disk drives as storage device 134. In other embodiments, storage device 134 is external to server system 201 and may be accessed by a plurality of server systems 201. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 205 is operatively coupled to storage device 134 via a storage interface 220. Storage interface 220 is any component capable of providing processor 205 with access to storage device 134. Storage interface 220 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 205 with access to storage device 134.

Memory area 210 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 3:
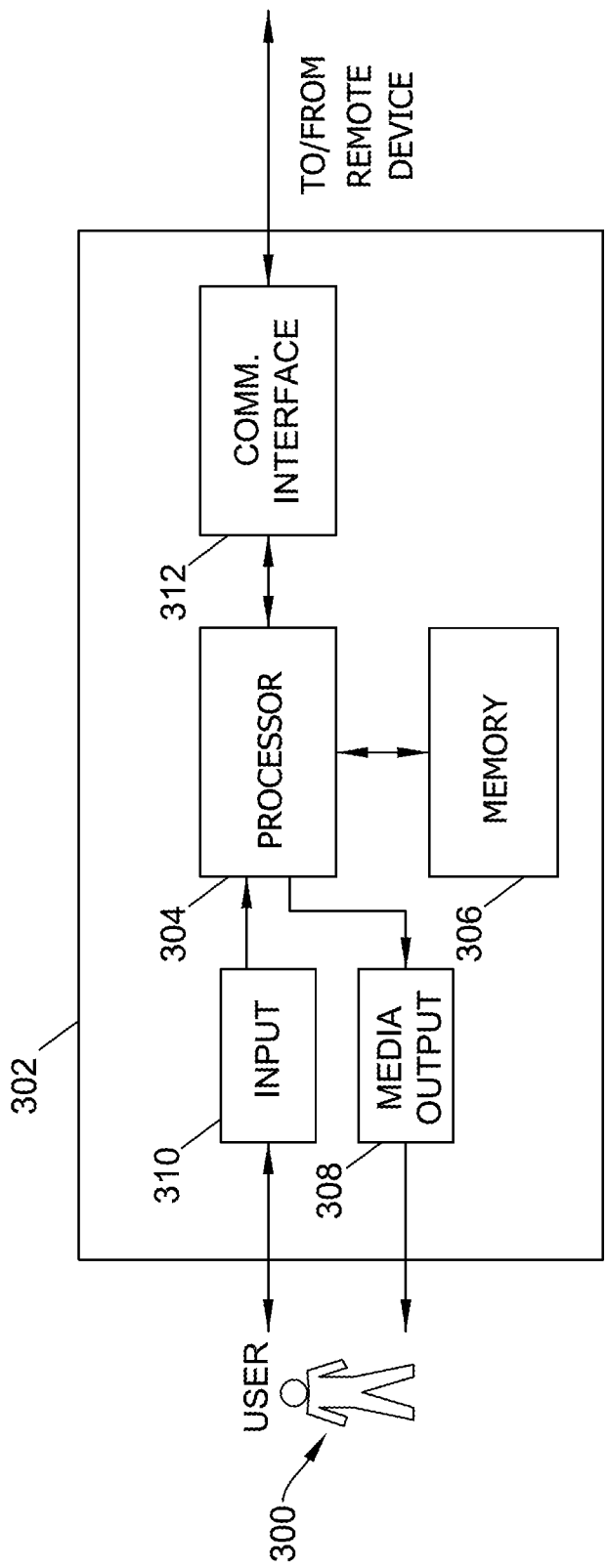

FIG. 3 illustrates an example configuration of a client computing device 302. Client computing device 302 may include, but is not limited to, client systems ("client computing devices") 114. Client computing device 302 includes a processor 304 for executing instructions. In some embodiments, executable instructions are stored in a memory area 306. Processor 304 may include one or more processing units (e.g., in a multi-core configuration). Memory area 306 is any device allowing information such as executable instructions and/or other data to be stored and retrieved. Memory area 306 may include one or more computer-readable media.

Client computing device 302 also includes at least one media output component 308 for presenting information to a user 300 (e.g., an employee or administrator). Media output component 308 is any component capable of conveying information to user 300. In some embodiments, media output component 308 includes an output adapter such as a video adapter and/or an audio adapter. An output adapter is operatively coupled to processor 304 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 302 includes an input device 310 for receiving input from user 300. Input device 310 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 308 and input device 310.

Client computing device 302 may also include a communication interface 312, which is communicatively couplable to a remote device such as server system 201 or a web server operated by a merchant. Communication interface 312 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 306 are, for example, computer-readable instructions for providing a user interface to user 300 via media output component 308 and, optionally, receiving and processing input from input device 310. A user interface may include, among other possibilities, a web browser and client application. Web browsers enable users 300 to display and interact with media and other information typically embedded on a web page or a website from a web server associated with a merchant. The user interface, via one or both of a web browser and a client application, facilitates display of campaign data by RA computing device 112. The user may interact with the user interface in association with a campaign, for example, by selecting to download or upload a tracer file using input device 310.

Figure 4:
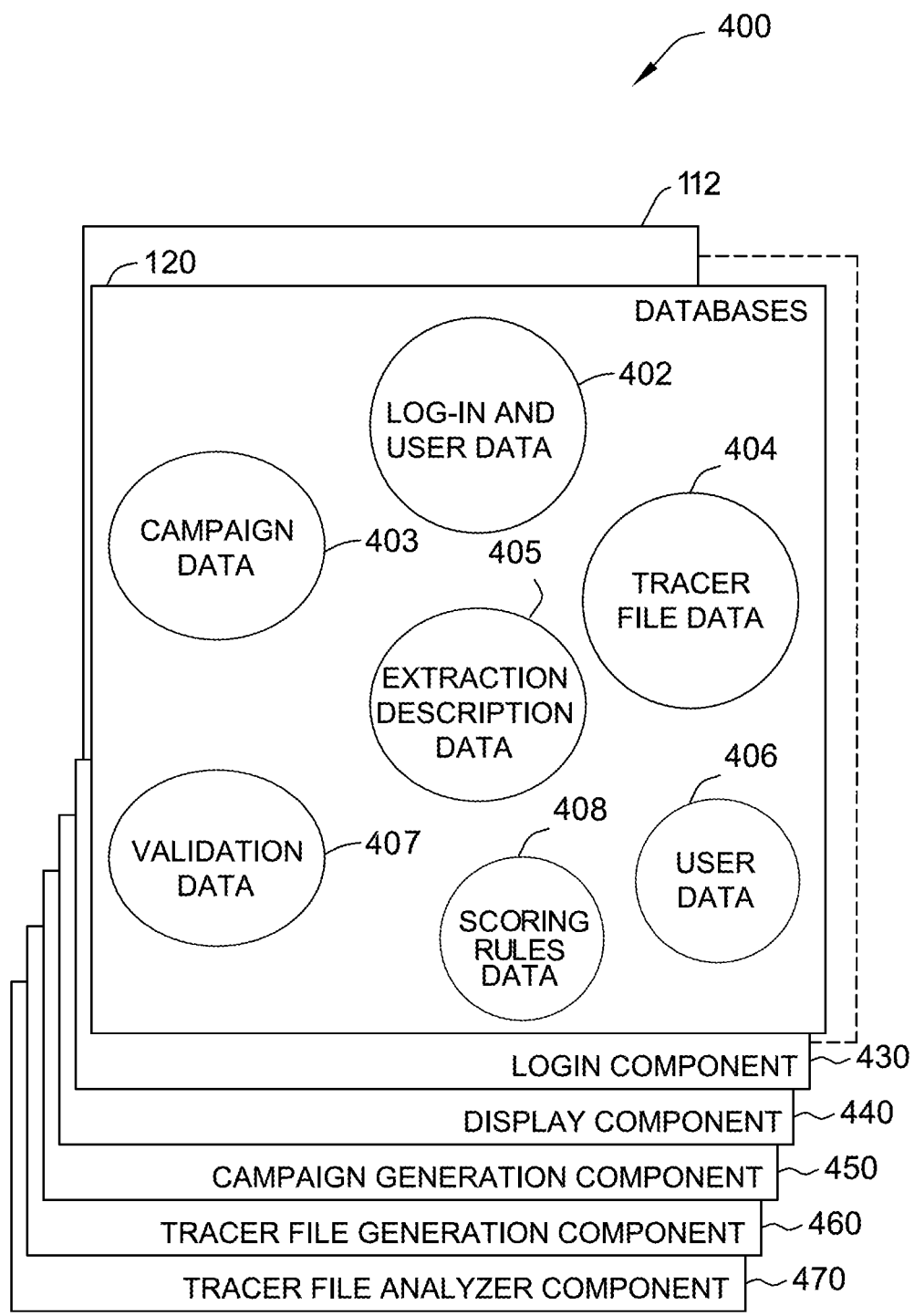

FIG. 4 is a diagram 400 of components of one or more example computing devices that may be used with RA computing device 112 in the environment shown in FIG. 1. FIG. 4 further shows a configuration of databases including at least database 120 (shown in FIG. 1). Database 120 may store information such as, but not limited to, login and user data 402, campaign data 403, tracer file data 404, extraction description data 405, user data 406, validation data 407, scoring rules data 408, and/or other data. Database 120 is coupled to several separate components within RA computing device 112, which perform specific tasks.

RA computing device 112 includes login component 430 for handling user logins to the web portal hosted by or otherwise provided using RA computing device 112. Login component 430 receives candidate login information from a user using a user device. Login component 430 compares the candidate login information to the database of login information and determines if the candidate login information (e.g., username and password) matches login information stored in the database of login information. If there is a match, login component 430 retrieves from the database of login information campaign data for the administrator or user.

In the example embodiment, RA computing device 112 includes a display component 440 for causing a user device to display campaign data. Display component 440 uses the campaign data retrieved by login component 430 to determine which data to display to the administrator or user.

Display component 440 causes a user device to display the appropriate campaign data. For example, display component 440 may transmit instructions to the user device that cause the user device to display the example screenshots depicted in FIGS. 5-8.

RA computing device 112 further includes a campaign generation component 450, a tracer file generation component 460, and a tracer file analyzer component 470. Campaign generation component 450 enables administrative users (i.e., administrators) to create campaigns. Tracer file generation component 460 enables users (i.e., employees) to create tracers files with RA computing device 112. Tracer file analyzer component 470 analyzes an uploaded tracer file to determine a level of security risk associated with a security gap.

Figure 5:
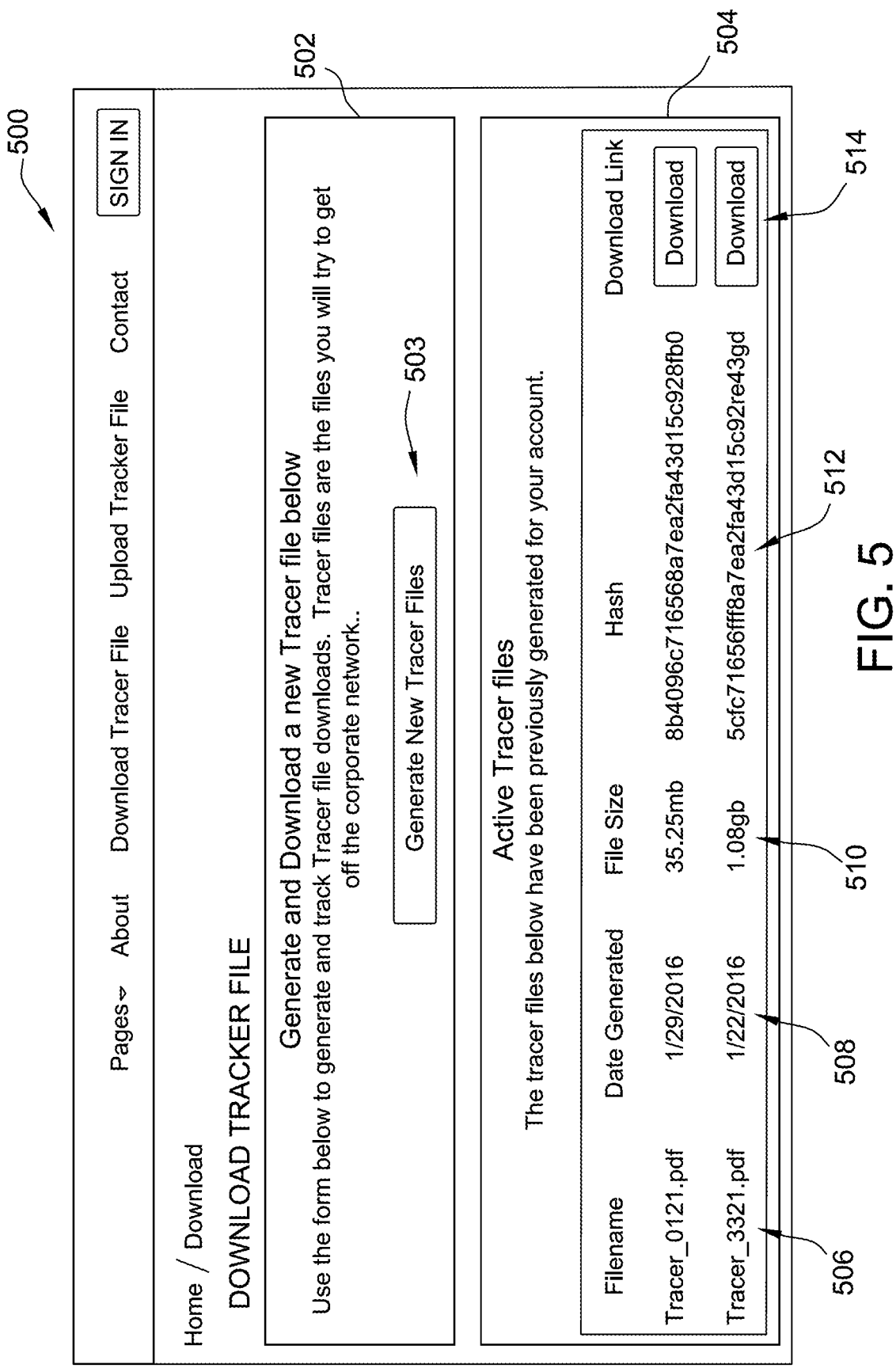

FIG. 5 is an example screenshot displayed on a user interface (e.g., user interface 118, shown in FIG. 1) of a user computing device (e.g., client system 114, also shown in FIG. 1) displaying an example user interface 500 for downloading a tracer file using RA computing device 112, as described above. User interface 500 may be hosted by RA computing device 112 or otherwise made accessible to a user. User interface 500 including an option to generate and download a tracer file 502. For example, option 502 may display a button 503 to generate and download a tracer file and/or other information.

In the example embodiment, user interface 500 further includes a menu 504 of active tracer files. Menu 504 allows a user of user interface 500 to view active tracer files previously generated by the user. Menu 504 further includes names 506 of the active tracer files, dates 508 that the active tracer files were generated, file sizes 510 of the active tracer files, hash values 512 of the active tracer files, and download buttons 514 to download the active tracer files.

FIG. 6 is an example screenshot displayed on a user interface (e.g., user interface 118, shown in FIG. 1) of a user computing device (e.g., client system 114, also shown in FIG. 1) displaying an example user interface 600 for uploading a tracer file using RA computing device 112, as described above. User interface 600 may be hosted by RA computing device 112 or otherwise made accessible to a user. User interface 600 includes a display of an option to upload a tracer file 602. For example, option 602 may display a button 603 to upload a tracer file, whereupon the user can select the tracer file to upload.

In the example embodiment, user interface 600 further includes a completed campaigns menu 604. Menu 604 enables a user of user interface 600 to view completed campaigns for the user. Menu 604 further includes names 606 of the tracer files, dates 608 that the tracer files were generated, dates 610 that the tracer files were uploaded, file sizes 612 of the tracer files, verifications 614 of the tracer files, and a submission buttons 616 to submit the tracer file to a contest.

Figure 7A:
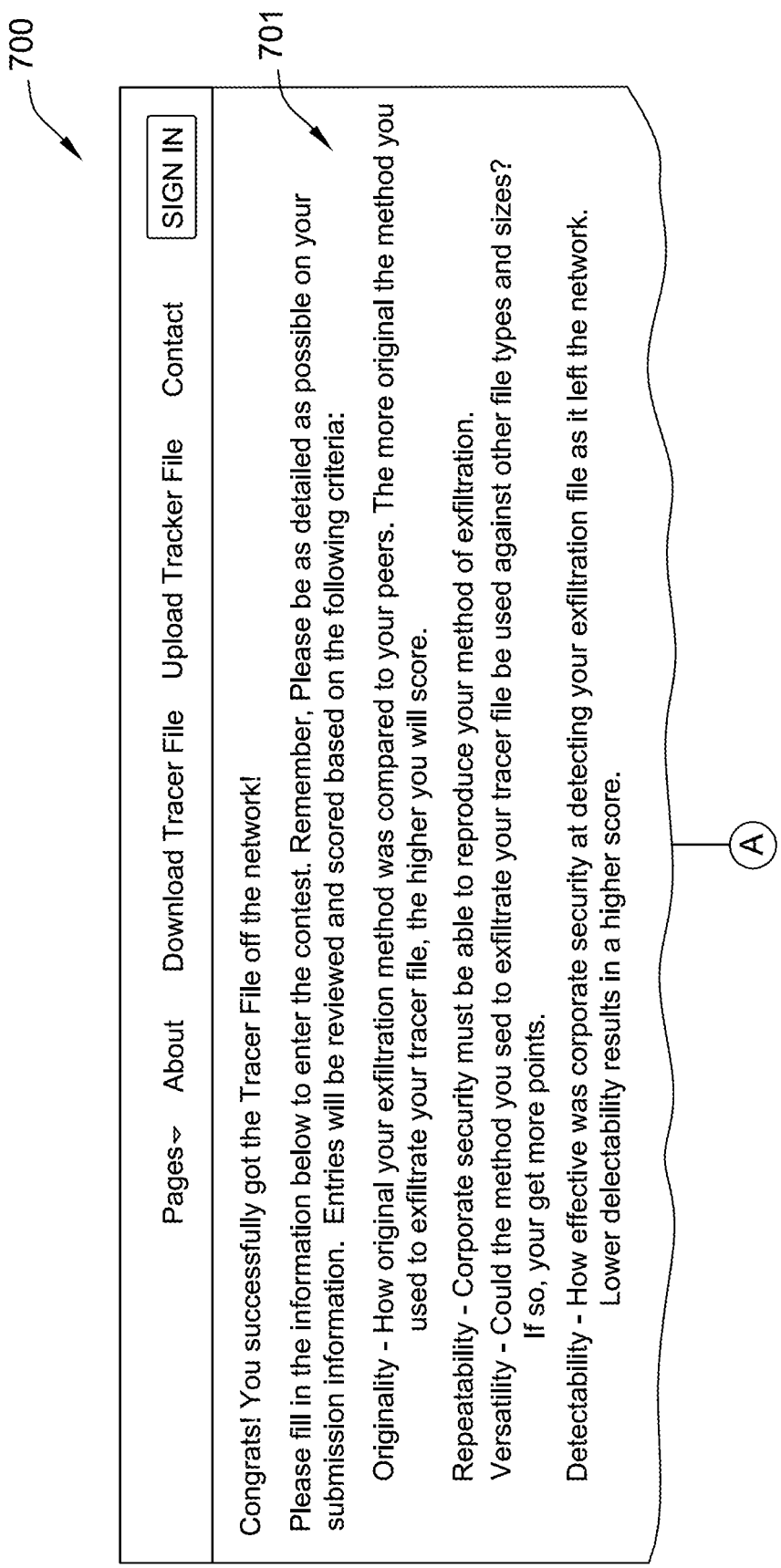

FIGS. 7A and 7B show an example screenshot displayed on a user interface (e.g., user interface 118, shown in FIG. 1) of a user computing device (e.g., client system 114, also shown in FIG. 1) displaying an example user interface element 700 for providing extraction description data using RA computing device 112 as described above. User interface element 700 may be hosted by RA computing device 112 or otherwise made accessible to a user. User interface 700 includes a summary 701 of scoring rules for scoring and analyzing an uploaded tracer files. User interface 700 includes an area 702 for a user to provide a written description of a method used by the user to remove the tracer files off the network.

In the example embodiment, user interface element 700 further includes a menu 704 of services used for the network exfiltration and extraction of the tracer file. Menu 704 enables a user of user interface element 700 to select services used. User interface element 700 further includes an area 706 for the user to provide a detailed written description of a method used to remove the tracer files from the network. User interface element 700 further includes a button 708 to submit the above information into a contest.

Figure 8A:
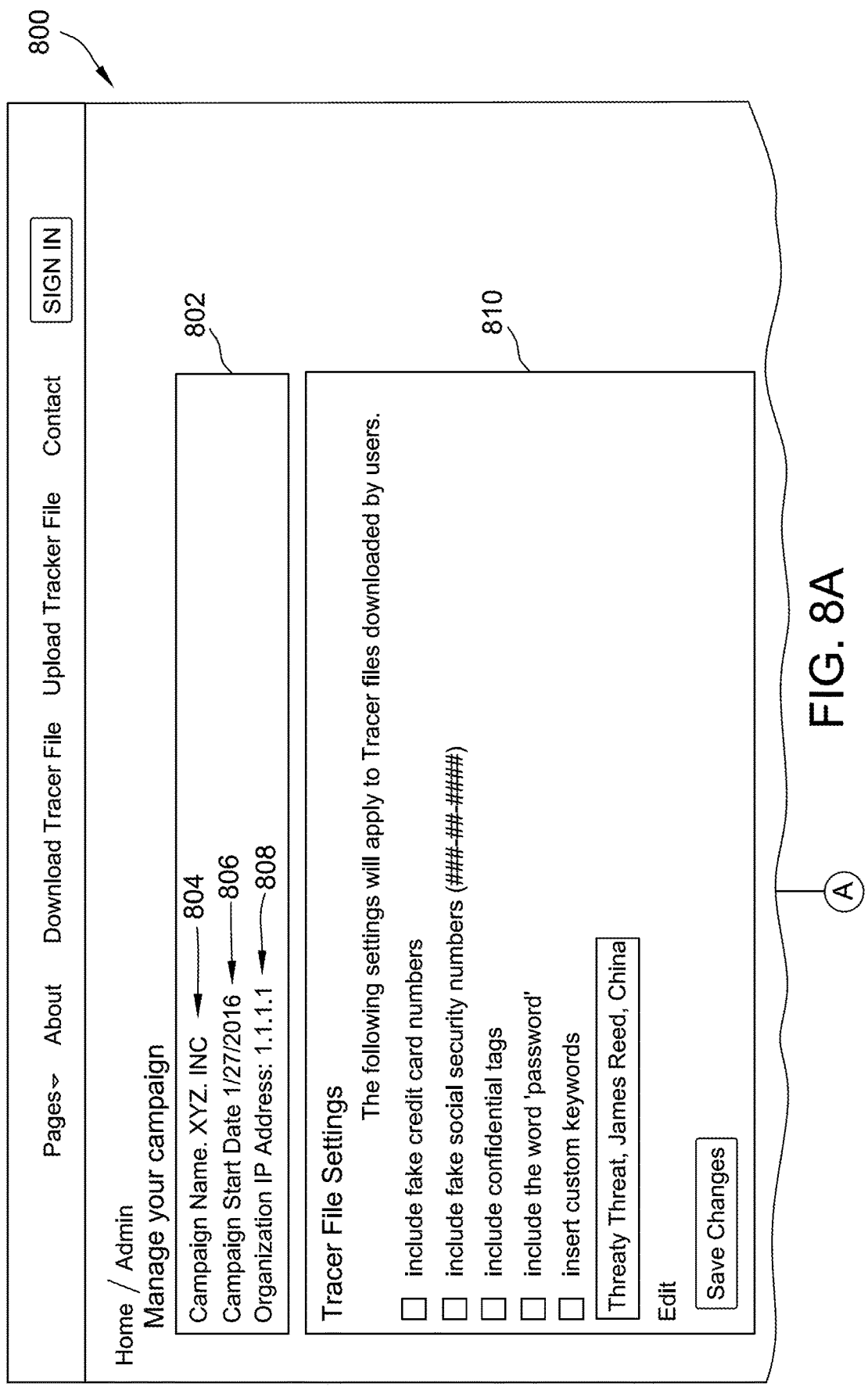

FIGS. 8A and 8B show an example screenshot displayed on a user interface (e.g., user interface 118, shown in FIG. 1) of a user computing device (e.g., client system 114, also shown in FIG. 1) showing an example user interface 800 for managing a campaign and/or viewing active campaigns using RA computing device 112, as described above. User interface 800 may be hosted by RA computing device 112 or otherwise made accessible to a user. User interface 800 may display information 802 on a new campaign, including a name 804 of the campaign, a campaign start date 806, and an organization IP address 808. User interface 800 further includes a menu 810 to select settings to apply to a tracer file in a campaign.

In the example embodiment, user interface element 800 further includes a menu 812 of active campaigns. Menu 812 enables an administrator to view active campaigns for employees, wherein each listed employee is associated with one or more tracer files. Menu 812 further includes user names 814 of employees, employee names 816, filenames 818 of tracer files, hash values 820 of the tracer files, whether the tracer files have been uploaded 822, whether the tracer files has been submitted 824 for analysis and/or to a contest, and actions 826 to be taken on the tracer files.

Figure 9:
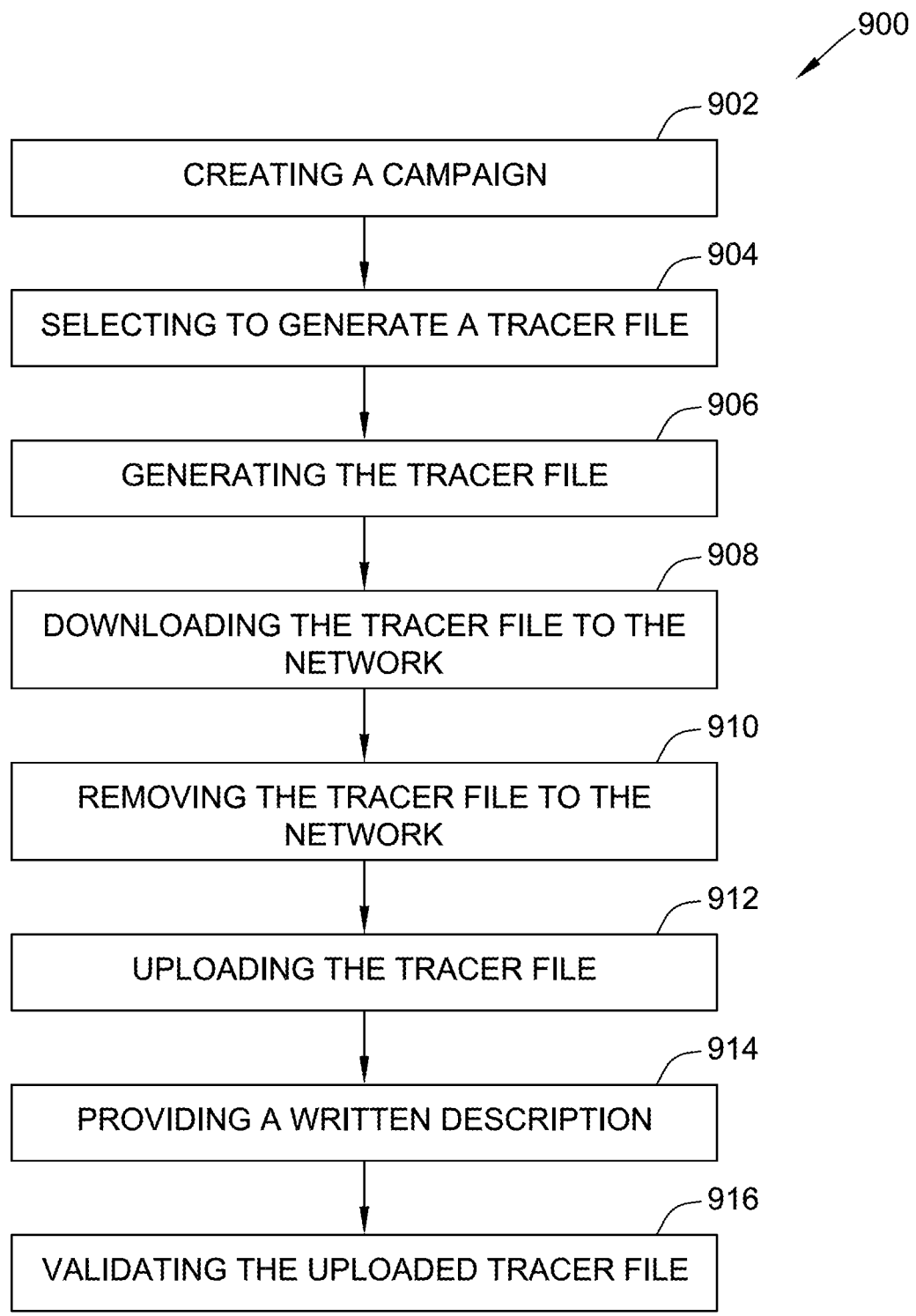

FIG. 9 is a simplified diagram of an example method 900 for enabling authorized users to participate in network security campaigns using a RA (risk assessment) computing device. An administrator creates 902 a campaign using a web portal, including selecting campaign customization options and specifying an external Internet protocol (IP) address range of the network prior to generating the campaign.

The campaign enables users to create a tracer file associated with the campaign. A user selects 904 to generate a tracer file using the web portal. A request for the tracer file generation webpage must come from a computing device with an IP address within the IP address range specified by the administrator. When a user uses the web portal to create a tracer file associated with a campaign, the RA computing device generates 906 the tracer file and downloads 908 the tracer file to a user computing device connected to a network. The user then removes 910 the tracer file from the network and onto a remote computing device that resides outside of the network. The user utilizes the web portal to upload 912 the tracer file from the remote computing device to the RA computing device. The user also provides 914 a written description of a method the user utilized to remove the tracer file from the network. In some embodiments, the user is entered into a contest for a chance to win prizes.

The RA computing device performs one or more validations 916 against the uploaded tracer file to ensure that the uploaded tracer file is the same tracer file that the user generated using the tracer file generation webpage.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

In addition, although various elements of the risk assessment (RA) computing device are described herein as including general processing and memory devices, it should be understood that the risk assessment (RA) computing device is a specialized computer configured to perform the steps described herein for generating and displaying network security campaigns to approved users for the purpose of allowing those users to attempt to discover network security gaps within an organization's computer network.

This written description uses examples to disclose the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A risk assessment (RA) computing device for generating network security campaigns to discover network security gaps, said RA computing device comprising at least one processor in communication with a memory, said at least one processor programmed to:

receive a range of internet protocol (IP) addresses of a protected network for storing within the memory, the range of IP addresses including IP addresses participating in the protected network;

receive, from a requesting computing device within the protected network, a request to generate a first tracer file, the generate request includes an IP address of the requesting computing device;

determine whether the requesting computing device is in the protected network by comparing the IP address of the requesting computing device to the range of IP addresses of the protected network stored within the memory;

if the requesting computing device is determined to be outside the protected network, block access to the first tracer file;

if the requesting computing device is determined to be in the protected network, generate the first tracer file, wherein the first tracer file is a non-executable file that includes at least one unique attribute and test sensitive data;

provide the first tracer file to the protected network to enable a verified user to attempt to retrieve the first tracer file from the protected network;

receive, from a submitting computing device, a request to upload a second tracer file to the memory, the second tracer file purported to be the first tracer file retrieved by the verified user from the protected network, the upload request includes an IP address of the submitting computing device;

determine whether the submitting computing device is outside of the protected network by comparing the IP address of the submitting computing device to the range of IP addresses of the protected network stored within the memory;

if the submitting computing device is determined to be in the protected network, block the uploading of the second tracer file to the memory;

if the submitting computing device is determined to be outside of the protected network, upload, from the submitting computing device, the second tracer file to the memory;

validate that the second tracer file uploaded from the submitting computing device is identical to the first tracer file provided on the protected network by comparing the second tracer file to the first tracer file to confirm that the first and second tracer files are identical to confirm that the protected network was compromised by the verified user; and authenticate the validity of the second tracer file as matching the first tracer file to a network security campaign based on the validation.

2. The RA computing device of claim 1, wherein the validation performed on the second tracer file to verify that the second tracer file is the first tracer file include at least one of (i) verifying an MD5 hash value associated with the second tracer file, (ii) a user agent string associated with the second tracer file, and (iii) a session cookie value associated with the second tracer file.

3. The RA computing device of claim 1, wherein the requesting computing device and the submitting computing device are the same computing device having a different IP address from the time when the request to generate the first tracer file is received and the time when the request to upload the second tracer file is received.

4. The RA computing device of claim 1, wherein said at least one processor is further programmed to receive, from the submitting computing device, a written description of how the verified user retrieved the first tracer file from the protected network.

5. The RA computing device of claim 4, wherein said at least one processor is further programmed to analyze the written description to determine a security risk level of the protected network by (i) parsing, tagging or filtering a descriptive text of the written description, (ii) applying rules stored within the memory for scoring the descriptive text, and (iii) assigning a predefined score to the descriptive text to rate the security risk level associated with the retrieval of the first tracer file from the protected network.

6. The RA computing device of claim 1, wherein said at least one processor is further programmed to generate and include the at least one unique attribute with the first tracer file for validating that the first tracer file was uploaded by the verified user who requested the generation of the first tracer file, the at least one unique attribute including at least one of: (i) a unique name given to the first tracer file upon generation, (ii) a unique identification given to the first tracer file upon generation, (iii) a time and a date that the first tracer file was generated, and (iv) a name of the user that requested generation of the first tracer file.

7. A computer-implemented method for generating network security campaigns to discover network security gaps, said method implemented by a risk assessment (RA) computing device in communication with a memory, a requesting computing device, and a submitting computing device, said method comprising:

receiving, by the RA computing device, a range of internet protocol (IP) addresses of a protected network for storing within the memory, the range of IP addresses including IP addresses participating in the protected network;

receiving, by the RA computing device, a request to generate a first tracer file by the requesting computing device, the generate request includes an IP address of the requesting computing device;

determining, by the RA computing device, whether the requesting computing device is in the protected network by comparing the IP address of the requesting computing device to the range of IP addresses of the protected network stored within the memory;

if the requesting computing device is determined to be outside the protected network, blocking access to the first tracer file;

if the requesting computing device is determined to be in the protected network, generating, by the RA computing device, the first tracer file, wherein the first tracer file is a non-executable file that includes at least one unique attribute and test sensitive data;

providing, by the RA computing device, the first tracer file to the protected network to enable a verified user to attempt to retrieve the first tracer file from the protected network;

receiving, by the RA computing device, a request to upload a second tracer file to the memory from the submitting computing device, the second tracer file purported to be the first tracer file retrieved by the verified user from the protected network, the upload request including an IP address of the submitting computing device;

determining, by the RA computing device, whether the submitting computing device is outside of the protected network by comparing the IP address of the submitting computing device to the range of IP addresses of the protected network stored within the memory;

if the submitting computing device is determined to be in the protected network, blocking, by the RA computing device, the uploading of the second tracer file to the memory;

if the submitting computing device is determined to be outside of the protected network, uploading, by the RA computing device from the submitting computing device, the second tracer file to the memory;

validating that the second tracer file uploaded from the submitting computing device is identical to the first tracer file provided on the protected network by comparing the second tracer file to the first tracer file to confirm that the first and second tracer files are identical to confirm that the protected network was compromised by the verified user; and authenticating the validity of the second tracer file as matching the first tracer file to a network security campaign based on the validation.

8. The method of claim 7, wherein performing the validation performed on the second tracer file to verify that the second tracer file is the first tracer file further includes at least one of (i) an MD5 hash value associated with the second tracer file, (ii) a user agent string associated with the second tracer file, and (iii) a session cookie value associated with the second tracer file.

9. The method of claim 7, wherein the requesting computing device and the submitting computing device are the same computing device having a different IP address from the time when the request to generate the first tracer file is received and the time when the request to upload the second tracer file is received.

10. The method of claim 7, further comprising receiving, by the RA computing device, a written description from the submitting computing device of how the verified user retrieved the first tracer file from the protected network.

11. The method of claim 10, further comprising analyzing, by the RA computing device, the written description to determine a security risk level of the protected network.

12. The method of claim 7, further comprising generating, by the RA computing device, the at least one unique attribute associated with the verified user that requested the generating of the first tracer file for identifying the first tracer file, and including the at least one unique attribute in the first tracer file when generating the first tracer file.

13. A computer-readable storage media for storing network security campaigns to discover network security gaps having computer-executable instructions embodied thereon, wherein, when executed by at least one processor, the computer-executable instructions cause the at least one processor to:

receive a range of internet protocol (IP) addresses of a protected network for storing within a memory, the range of IP addresses including IP addresses predefined as participating in the protected network;

receive, from a requesting computing device, a generate request to generate a first tracer file, wherein the generate request includes an IP address of the requesting computing device;

determine whether the requesting computing device is in the protected network by comparing the IP address of the requesting computing device to the range of IP addresses of the protected network stored within the memory;

if the requesting computing device is determined to be outside the protected network, block access to the first tracer file;

if the requesting computing device is determined to be in the protected network, generate the first tracer file, wherein the first tracer file is a non-executable file that includes at least one unique attribute and test sensitive data;

provide the first tracer file to the protected network to enable a verified user to attempt to retrieve the first tracer file from the protected network;

receive a request to upload a second tracer file to the memory from a submitting computing device, the second tracer file purported to be the first tracer file retrieved by the verified user from the protected network, the upload request includes an IP address of the submitting computing device;

determine whether the submitting computing device is outside of the protected network by comparing the IP address of the submitting computing device to the range of IP addresses of the protected network stored within the memory;

if the submitting computing device is determined to be in the protected network, block the uploading of the second tracer file to the memory;

if the submitting computing device is determined to be outside of the protected network, upload, the second tracer file to the memory;

validate that the second tracer file uploaded from the submitting computing device is identical to the first tracer file provided on the protected network by comparing the second tracer file to the first tracer file to confirm that the first and second tracer files are identical to confirm that the protected network was compromised by the verified user; and authenticate the validity of the second tracer file as matching the first tracer file to a network security campaign based on the validation.

14. The computer-readable storage media in accordance with claim 13, wherein the computer-executable instructions further cause the at least one processor to perform the validation on the second tracer file by verifying at least one of (i) an MD5 hash value associated with the second tracer file, (ii) a user agent string associated with the second tracer file, and (iii) a session cookie value associated with the second tracer file.

15. The computer-readable storage media in accordance with claim 13, wherein the requesting computing device and the submitting computing device are the same device having a different IP address from the time when the request to generate the first tracer file is received and the time when the request to upload the second tracer file is received.

16. The computer-readable storage media in accordance with claim 13, wherein the computer-executable instructions further cause the at least one processor to receive, from the submitting computing device, a written description of how the verified user retrieved the second tracer file from the protected network.

17. The computer-readable storage media in accordance with claim 16, wherein the computer-executable instructions further cause the at least one processor to analyze the written description to determine a security risk level of the protected network.

18. The computer-readable storage media in accordance with claim 13, wherein the computer-executable instructions further cause the at least one processor to receive the at least one unique attribute associated with the verified user that requested the generating of the first tracer file for identifying the first tracer file and including the at least one unique attribute in the first tracer file when generating the first tracer file.

19. The RA computing device of claim 1, wherein the validation performed on the second tracer file to verify that the second tracer file is the first tracer file includes comparing a first hash value associated with the first tracer file to a second hash value associated with the second tracer file.

* * * * *